United States Patent
De Luca et al.

(10) Patent No.: US 12,126,167 B2
(45) Date of Patent: Oct. 22, 2024

(54) DEVICE FOR THE CERTIFIED MEASUREMENT OF ELECTRIC PARAMETERS AND CUSTOMERS' FLEXIBILITY BEHAVIOUR, AND FOR COMMUNICATING WITH A DISTRIBUTION SYSTEM OPERATOR

(71) Applicants: ACEA S.P.A., Rome (IT); INDRA ITALIA S.P.A., Rome (IT); APIO S.R.L., Pescara (IT)

(72) Inventors: Ercole De Luca, Rome (IT); Francesco Ruggieri, Rome (IT); Lorenzo Di Berardino, Pianella (IT)

(73) Assignees: ACEA S.P.A., Rome (IT); INDRA ITALIA S.P.A., Rome (IT); APIO S.R.L., Pescara (IT)

( * ) Notice: Subject to any disclaimer, the term of this patent is extended or adjusted under 35 U.S.C. 154(b) by 346 days.

(21) Appl. No.: 17/776,916

(22) PCT Filed: Nov. 13, 2020

(86) PCT No.: PCT/IB2020/060693
§ 371 (c)(1),
(2) Date: May 13, 2022

(87) PCT Pub. No.: WO2021/094994
PCT Pub. Date: May 20, 2021

(65) Prior Publication Data
US 2022/0416570 A1    Dec. 29, 2022

(30) Foreign Application Priority Data
Nov. 14, 2019   (IT) .................... 102019000021162

(51) Int. Cl.
*H02J 13/00* (2006.01)
*G05B 15/02* (2006.01)
(Continued)

(52) U.S. Cl.
CPC ........ *H02J 13/00002* (2020.01); *H02J 3/008* (2013.01); *G05B 15/02* (2013.01);
(Continued)

(58) Field of Classification Search
CPC . H02J 13/0002; H02J 3/00; H02J 3/08; G05B 15/02; H04Q 9/00; G06Q 50/00; G06Q 50/06
(Continued)

(56) References Cited

U.S. PATENT DOCUMENTS 11,431,171 B2 *   8/2022   Tobin ...................... H02J 3/008
2018/0299852 A1*   10/2018   Orsini .................... G06Q 50/06
(Continued)

FOREIGN PATENT DOCUMENTS

CN    213518339 U   *   6/2021
CN    113468551 A   *   10/2021
(Continued)

OTHER PUBLICATIONS

Songsong Chen, et al., "Application and Prospect of Integrated Energy Interoperability Management System Based on Blockchain", 2019 IEEE International Conference on Energy Internet (ICEI), IEEE, May 27, 2019, pp. 421-425 (5 pages).
(Continued)

*Primary Examiner* — Ronald D Hartman, Jr.
(74) *Attorney, Agent, or Firm* — NIXON & VANDERHYE

(57) ABSTRACT

Disclosed is a device for the certified measurement of electric parameters and customers' flexibility behaviour, and for communicating with a distribution system operator, comprises a System on Module, or SoM, a Certification Module, a Customer Communication Module and a Communication Module.

20 Claims, 3 Drawing Sheets

(51) Int. Cl.
   *G06Q 50/00* (2024.01)
   *G06Q 50/06* (2024.01)
   *H02J 3/00* (2006.01)
   *H04Q 9/00* (2006.01)

(52) U.S. Cl.
   CPC ............ *G06Q 50/00* (2013.01); *G06Q 50/06* (2013.01); *H04Q 9/00* (2013.01)

(58) Field of Classification Search
   USPC ......................................................... 700/291
   See application file for complete search history.

(56) References Cited

U.S. PATENT DOCUMENTS

| | | | | |
|---|---|---|---|---|
| 2019/0172159 A1* | 6/2019 | Sun | ...................... | G06Q 30/018 |
| 2019/0325430 A1* | 10/2019 | Cui | ...................... | G06Q 20/367 |
| 2021/0194245 A1* | 6/2021 | Tobin | ...................... | G06Q 40/04 |
| 2022/0179378 A1* | 6/2022 | Gourisetti | ............. | H04L 9/3239 |
| 2022/0237695 A1* | 7/2022 | Hwang | ............... | G06Q 20/3827 |
| 2022/0416541 A1* | 12/2022 | Abaas | ...................... | H02J 3/004 |
| 2023/0068532 A1* | 3/2023 | Forbes, Jr. | ............. | G06Q 30/08 |

FOREIGN PATENT DOCUMENTS

| | | | | | |
|---|---|---|---|---|---|
| CN | 114092251 A | * | 2/2022 | | |
| EP | 3 460 942 | | 3/2019 | | |
| EP | 3460942 A1 | * | 3/2019 | ............. | G01D 4/004 |
| GB | 2564389 A | * | 1/2019 | ............. | G01D 4/004 |
| WO | 2019/070357 | | 4/2019 | | |
| WO | WO-2019070357 A1 | * | 4/2019 | | |
| WO | WO-2019075186 A1 | * | 4/2019 | ......... | G05B 13/0265 |
| WO | WO-2019243524 A1 | * | 12/2019 | ............. | B60L 53/60 |
| WO | WO-2021094994 A1 | * | 5/2021 | ........ | H02J 13/00002 |

OTHER PUBLICATIONS

International Search Report and Written Opinion of the ISA for PCT/IB2020/060693 dated Mar. 11, 2021, 12 pages.

* cited by examiner

DEVICE FOR THE CERTIFIED MEASUREMENT OF ELECTRIC PARAMETERS AND CUSTOMERS' FLEXIBILITY BEHAVIOUR, AND FOR COMMUNICATING WITH A DISTRIBUTION SYSTEM OPERATOR

CROSS-REFERENCE TO RELATED APPLICATIONS

This application is the U.S. national phase of International Application No. PCT/IB2020/060693 filed Nov. 13, 2020 which designated the U.S. and claims priority to Italian Patent Application No. 102019000021162 filed Nov. 14, 2019, the entire contents of each of which are hereby incorporated by reference.

BACKGROUND OF THE INVENTION

Field of the Invention

The present invention substantially concerns the Electric Energy Sector, and more particularly a device for provide an efficient and reliable implementation of the Energy Flexibility Market.

Description of the Related Art

The present electricity sector is experiencing a plurality of new trends that are deeply changing it, opening at the same time new opportunities and new technical problems, not solved by known technology.

The traditional supply chain of the electric energy sector is constituted by geographically concentrated sites for production of energy, where produced energy is transported for long distances by the TSO (Transmission System Operator) at High Voltage and then simply distributed to the final users by the Distribution System Operator (DSO) at Medium Voltage (MV)/Low Voltage (LV).

The growth of Distributed Energy Resources (DER), like photovoltaic, and the continuous improvement of the use of local energy storage, usually connected to the DSO's MV/LV grids, has deeply changed the role of the DSO that has to face with new problems related to the network management. A typical problem is the management of the reverse power flow that occurs when the local energy production in a part of the grid exceeds the local energy consumption. When this happens, the energy passes from a lower to a higher voltage grid part (and then from the DSO's to the TSO's grids). In order to avoid these problems, the DSO has to control and regulate the energy flow in the grid implementing "smart grid" management and new technical concepts.

The phenomena has reached crucial levels in the recent years, to such an extent that the European Union has just issued, on June 2019, a set of Directives (named "Clean Energy Package") in order to regulate the role of TSOs, DSOs, Energy Traders, Aggregators and Customers with the aim to foster the growth of a new "energy flexibility market". In the flexibility market all the actors of the energy sector cooperate to maximize the local production and use of energy; customers are encouraged by financial incentives to a "flexible" use of the energy according to TSOs and DSOs requests to improve or decrease the absorption or the injection of energy (from photovoltaic or storages) from/into the grid.

The Clean Energy Package urges the implementation of "local flexibility markets" where customers can sell their flexibility capacity (by regulating absorption or production) to TSOs and DSOs, being remunerated proportionally to the modulated power and to the fitting with the System Operator's requests.

For the reasons indicated above, for DSOs it is no longer matter to distribute the electricity in "one way" from the TSO to the Customer and then just measure it through the classical Smart Meters, but in the new role required by European Legislation the DSO is due:

1. to manage his network "dynamically", handling a "two way" flow of the energy;
2. to include customers in the network management process by measuring in real time their behavior (consumption and production) and at the same time notifying to the customers, through predefined signals, the flexibility requests (Power Set Points, now on said simply Set Points) they have to fulfill;
3. to certify all the real time measures of energy use and flexibility requests signals (Set Points) sent to the customers in order to enable the new complex billing process for the flexibility market minimizing investments in measuring equipment and conflicts/disputes in the reconcile of energy measures coming from different actors (for example discrepancies of measures between Energy Trader, Aggregator and TSO for the financial remuneration of the flexibility service to the customer).

By analyzing the worldwide implementation of energy the flexibility market, it will be immediately evident that the only customers presently involved in flexibility services are the "big ones", i.e. customers with very high energy consumptions like industries or large offices buildings. This is mainly due to the fact that the today known equipment to be installed both to the customers side and to the Energy Operators side (TSOs, DSOs, Aggregators, Energy Traders), have a cost and a complexity such that the flexibility service is financially and technically sustainable only for big amounts of exchanged energy.

Today the typical equipment configuration of a "flexible customer" consists of:

I. a first DSO Smart Meter, installed by DSOs, recording the monthly aggregated amount of energy absorption or production;

II. a second customer flexibility meter, installed by the customer (or by the Aggregator) measuring the flexible behavior of the customers (i.e. recording the trend of energy absorbed or injected from/into the grid): this second meter doesn't communicate neither with the DSO's Smart Meter nor with the DSO's grid management systems;

III. a two-way communication equipment, used to transmit to the customer the TSO's requests of flexibility (Set Points) and to the Transmission System Operator the measures of said second meter: this equipment doesn't send information to DSO' grid management system and, most of the times, doesn't send information to both the customer and the aggregator at the same time.

IV. Connectivity (optical fiber or ADSL or 4G/3G/GSM etcetera) that normally has to be provided by the customer.

V. a customer "Energy Management System" that implements actions from customer side (reducing or increasing consumptions or productions), according to the Set Points received from the above mentioned communication equipment.

It is clear that with the known technology the customer/ Aggregator has to invest a lot of money in equipment—such as second customer flexibility meter and two-way communication equipment—to receive indications (Set Points) from the market (often the TSOs) and to measure his answers to these Set Points. In addition, this can generate three important issues:

a. the risk to create security and congestion problems to the DSO's grids since these equipment don't communicate to the DSO the action required to the customer connected to his grid;

b. continuing disputes over the financial remuneration of the service due to the need to reconcile different measuring systems (the DSO Smart Meter with the second flexibility meter) operated by different equipment with different sampling intervals (e.g.: a month against few seconds). This is today one of the most heavy and impacting problem in the flexibility market;

c. disputes concerning the actual Set Point send by TSO to the customer (and then on the answer of the customer to that Set Point) since the transmission/reception of Set Points is not certified and transparently published by existing technology.

In view of the above, it is absolutely clear that there is a need of a new equipment able to solve all the above issues in a new a more efficient way.

SUMMARY OF THE INVENTION

A main aim of the present invention is to overcome the above problems and drawbacks by providing a new device enabling the energy flexibility market in an efficient and reliable manner.

A second aim of the invention is to provide a device which provides a standard, open, non-discriminating tool common to all the market players (from customers, towards aggregators, to DSOs and TSOs).

A third aim of the present invention is to provide a device which merges together the first three functionalities described above (i.e.: I—DSO Smart Meter, II—customer flexibility meter, III—two-way communication equipment) thereby creating a in such a way a single, indisputable, certified measuring and communicating device serving all the energy market players and customers.

This new and unique feature of the invention definitively solves disputes and generates efficiency to all the energy market structure, reducing entry barriers to the flexibility market fostering a mass diffusion of the same market, including also small prosumers (i.e. a general customer that produces and consumes energy) like normal residential users and small offices.

According to the present invention, the device herein disclosed is configured to perform and certify all the needed measurements and signalling toward/from the customer and ensures disputes resolving mechanisms. The possibility to constantly monitor certified measurements of energy flows, in conjunction with a certified tracking of flexibility requests, gives to TSOs, DSOs, Aggregators and Customers all the necessary tools to implement and bill the energy flexibility market. Through the use of an optional Web/Mobile App, the prosumer can act on the market and check the results of his actions (eventually intermediated by an Aggregator) and avoid eventual disputes that may arise between every market player.

Advantageously, the device according to the present invention:

from customer side, actively includes prosumers in the Distribution Network Management Process remunerating them according to their actual and effective answer to the requested Set points received by the DSO;

at the same time, DSOs are aware in real time of each flexibility request coming from the market to the customer and of the response of the customers connected to the distribution network: this enables DSOs to guarantee the network service continuity, analyze the Set Point requested to the customer and verify them in terms of security and network status capability. If a requested Set point is safe for the network, DSO will forward it to the customer through the device, otherwise DSO will require to the market the amendment of such Set Point;

at the end of every "flexibility sampling period" (the Device is able to adjust the sampling period for measurements and Set Point signalling from fraction of a second to months) the Device is configured to send all the certified data to the DSO that will publish them to the relevant market players (for billing, energy balances, overall network management, . . . ) and will use the same data for an advanced and optimized Distribution Network Management.

It is important to underline that, according to the present invention, it is provided an automatic dispute resolution capability: in fact, all the actors have the same, certified measure of electricity parameters and tracking of signalling.

In addition, since the DSO directly sends the Set Point to the customer through the device herein disclosed, the customer is guaranteed that his flexibility action is not creating any trouble to his own Distribution Network.

BRIEF DESCRIPTION OF THE DRAWINGS

A better understanding of the invention will be obtained following detailed description, with reference to the attached drawings, which illustrate some preferred embodiments of the invention.

In the drawings.

DESCRIPTION OF THE PREFERRED EMBODIMENTS

Figure 1:
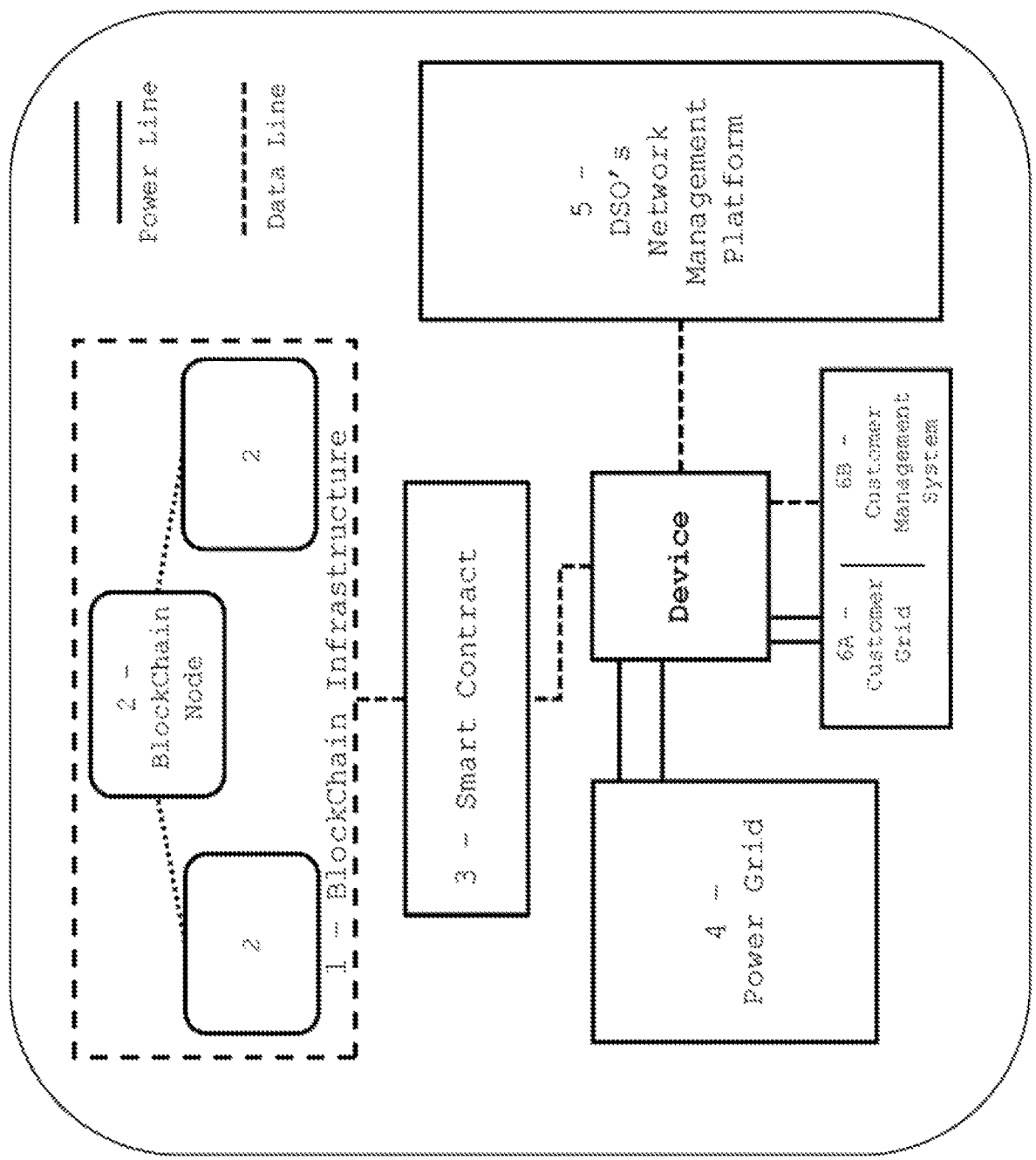
FIG. 1 is a schematic block diagram of the architecture of the flexibility market solution, comprising the device according to the invention.
Figure 2:
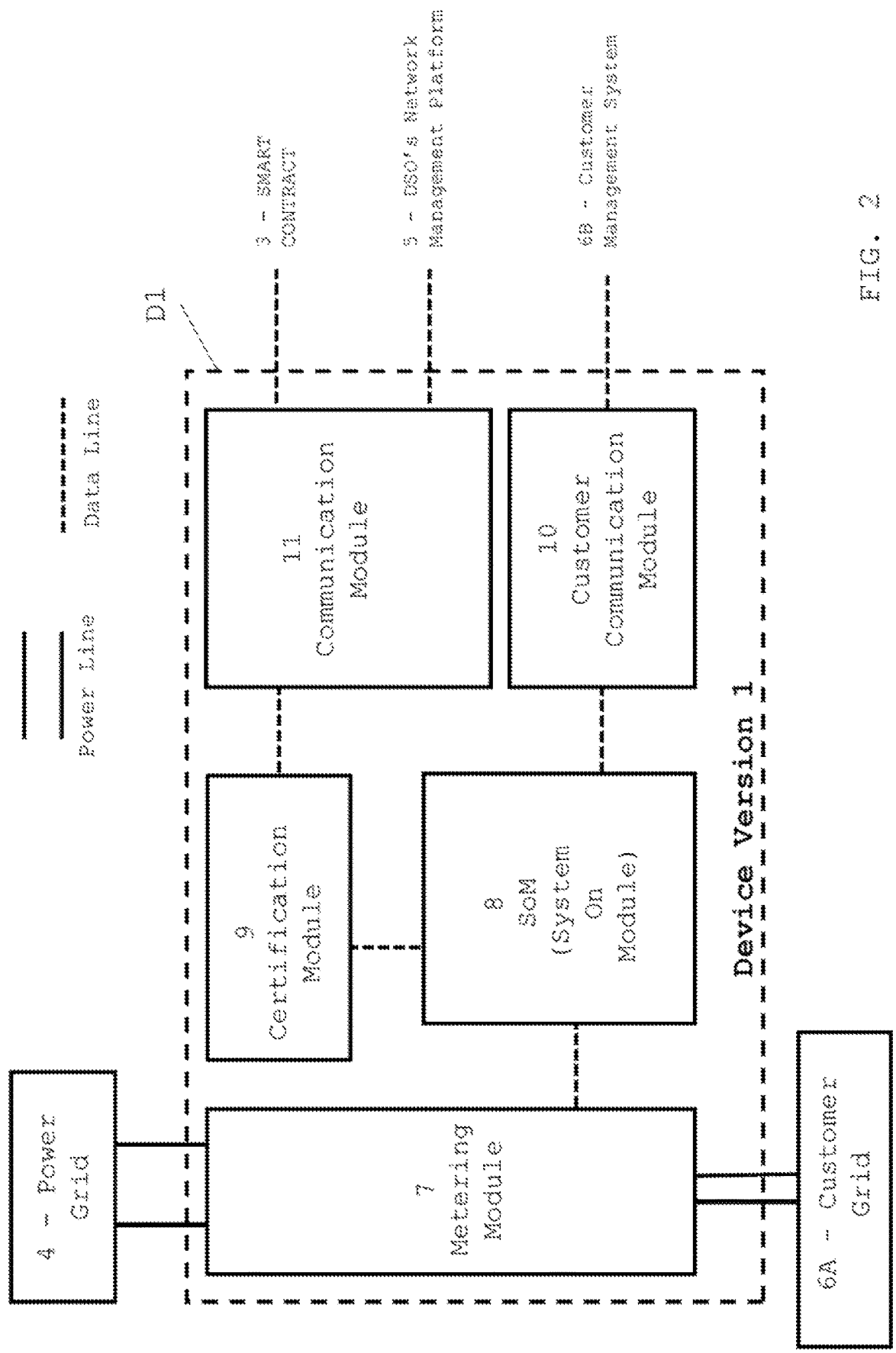
FIG. 2 is a schematic block diagram of a first embodiment of the device according to the present invention, wherein the DSO's Smart Meter is comprised therein.

Referring to FIGS. 1 and 2, concerning the first embodiment of the invention including also the DSO's Smart Meter, the device now on named (D1) comprises:

a. a Metering Module (7) which, similarly to known DSO's Smart Meter, is configured for the real time monitoring and recording of the electrical parameters of the energy coming from the DSO's grid (voltage, current, cos ☐, active and reactive energy and power, . . . )

b. a SoM (System on Module) (8)—i.e. a board-level circuit that integrates Computer functionalities in a single module—which is configured for elaborating the information coming from the Metering Module (7) and is connected to a Certification Module (9) and to a Customer Communication Module (10). The SoM is configured to receive the measures from the Metering Module (7) or from DSO's Smart Meter, to encode them together with both the Set Point sent by the DSO and the processed difference between the Set Point and the actual Customer's consumption/production values, and then to transfer all those values to both the Certification Module (9) and the Customer Communication Module (10);

c. the Certification Module (9), that is a microcontroller equipped with an integrated EEPROM for storing Security Key, Certificates and Private Key. Wherein such microcontroller is configured to implement also a complete asymmetric (public/private) key cryptographic signature solution. Furthermore, said microcontroller is configured for generating a "digital footprint" (hash) starting from the values received from the SoM (8), for signing said digital footprint through the public and the private keys provided by his chip, and for transferring those "signed data packet" to a Communication Module (11);

d. the Customer Communication Module (10)—i.e. a System on Chip integrating different communication modules (WiFi, Bluetooth, Cellular, Ethernet, . . . )—is connected to the Customer Management System (6B) and is configured to send him the information received from the SoM (8), which are exactly the same information received by the Certification Module (9), except that they are not digitally signed. The information package sent to the Customer Management System (6B) contains all the real time measurement data, the Set Point of the relevant sampling period received from the DSO through the "Communication Module" (11), and the differences between the Set Point and the actual customer's energy use;

e. the Communication Module (Toward DSO) (11), that is a System on Module that implements several communication protocols (PowerLine, Cellular, Ethernet, WiFi and so on) and is configured to perform a bidirectional communication with the DSO's Network Management Platform (5). The Communication Module (11) receives the Set point from the DSO and transfers it to the Certification Module (9). On another communication way, the Communication Module (11) sends the Certified Data Packet received by the Certification Module (9) to the Smart Contract (3) (see FIG. 1), and then the Smart Contract (3) records those values in the Blockchain Infrastructure (2) owned by the DSO for the necessary use. The Certified Data sent by the Communication Module (11) are sent to both the DSO's Network Management Platform (5) and the Smart Contract (3).

Figure 3:
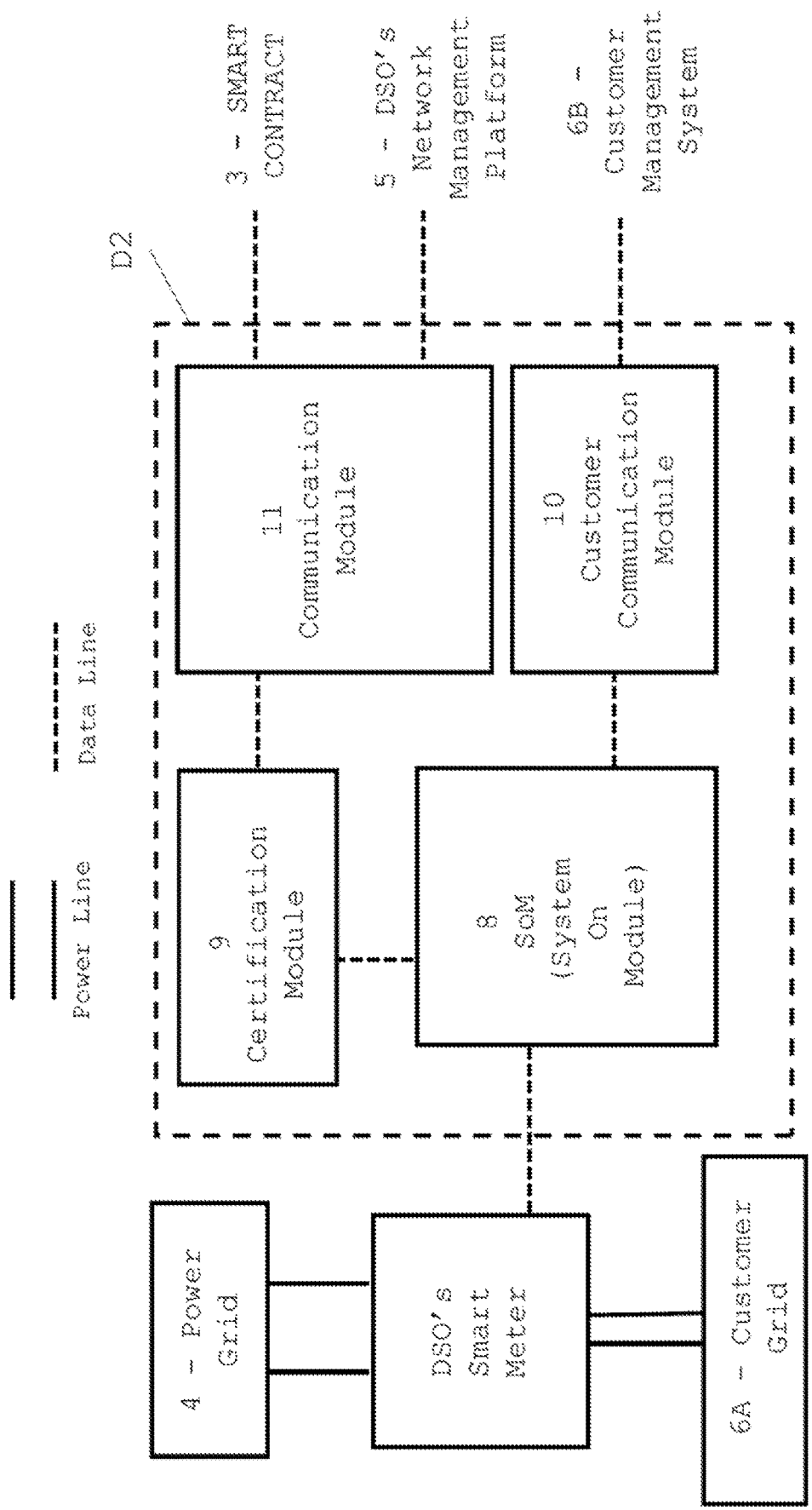
FIG. 3 is a schematic block diagram of a second simplified embodiment of the device according to the present invention, wherein the DSO's Smart Meter is not comprised therein.

Advantageously, as already pointed out, the information contained in the Certified Data sent to the DSO by the Communication Module (11) are exactly the same sent to the customer by the Customer Communication Module (9): this feature avoids completely any dispute between energy sector actors In a (second) simplified embodiment of the present invention, the Device (now on named D2) is configured to be connected to the existing DSO's Smart Meter: this version may be preferable in most cases, since doesn't require the DSO to substitute any already installed Smart Meter (FIG. 3).

This second embodiment of the device (D2) differs from the first embodiment of the device (D1) for two main aspects:

the electric power to the Customer Grid is provided directly by the already installed DSO's Smart Meter and not by the Device (D2);

the electrical measurement of the Customers' behaviours are performed by an external DSO's Smart Meter connected to the Device (D2) and not by an internal metering module (7) of the device, like in the first embodiment of the Device (D1).

The communication channels between the DSO's Smart Meter and this simplified embodiment of the Device (D2) can be different with respect to first embodiment of the device (D1) and depend upon the constructive technology of the DSO's Smart Meter: for example, this channel can be an 18.1 type (Power-Line, Wi-Fi, NB-IOT . . . ) or any other interface available on the market or purposely designed for the specific Smart Meter.

Through the above mentioned communication channel, the electrical information (voltage, current, cos ☐, active and reactive energy and power, . . . ) are transferred to the SoM (8) of the simplified Device Version (D2) and, from this point forward, the operation of the device is exactly the same of the first embodiment of the Device (D1).

In case the DSO's Smart Meter where not able to perform all the measures required by the energy flexibility market, additional measuring unit can be added by the DSO to the existing Smart Meter and then connected to the simplified Device (D2).

After having disclosed the technical features of the Device (D1, D2) according to the present invention, it is useful to explain the integration of the Device itself into the overall DSO's flexibility system shown in FIG. 1.

The Device sends recorded data to a Blockchain Infrastructure (1), that process them by a Smart Contract (3), which is substantially a computer program that regulates the economic operations between the parties of the contract on the basis of:

the instantaneous and updated data acquired and certified by the Blockchain and the conditions and clauses defined therein.

The transmission of data is automatically done via a secured communication channel.

The Smart Contract (3) is subscribed by all the flexibility market "actors" (TSO, DSO, Aggregator, Customer, . . . ) so that the energy values, Set Points, billing information and so on elaborated by the Smart Contract are not disputable by anyone. The Smart Contract is configured to facilitate, verify and ensure the compliance of the parties to a contract or agreement, and to automatically execute the contract's clauses when specified conditions are met. The rules defined by the Smart Contract permit financial transactions among the actors of the value-chain, using the information collected by the Blockchain technology guaranteeing data immutability and consistency.

The rigid rules of the Smart Contract and the automated use of data ensure the certification of energy exchanges and reduce controversy risks among the actors.

Finally, please note that, according to the invention, it is also provided a system configured for facilitating, verifying and ensuring the compliance of the parties to a contract or agreement, and to automatically executing the contract's clauses when specified conditions are met: thereby permitting financial transactions among said parties, using the information collected by the Blockchain technology.

Said system comprising: at least a device (D1, D2) for the certified measurement of electric parameters and customers' flexibility behaviour, and for communicating with a distribution system operator, as well as a BlockChain Infrastructure (1) with a plurality of BlockChain nodes (2), a Smart Contract (3) software component, a Power Grid (4), a Customer Grid (6), a DSO's Network Management Platform (5), wherein said elements of the system are directly or indirectly connected and communicating each other.

The invention claimed is:

1. A device for the certified measurement of electric parameters and customer's flexibility behavior, and for communicating with a distribution system operator, wherein the device comprises a system on module, a certification module, a customer communication module and a communication module, wherein:
   I. the system on module is configured to elaborate information coming from a metering module or from a distribution system operator's smart meter, and is connected to said certification module and to said customer communication module;
   II. the certification module is connected to said system on module, and is configured to generate a digital footprint, starting from values received from the system on module, for signing said digital footprint through public and private keys provided by a chip, and for transferring a signed data packet to a communication module to which the certification module is further connected;
   III. the customer communications module is connected to both said system on module and to a customer management system, and is configured to send the information received from the system on module to the customer management system, the information being exactly the same information that is received by the certification module; and
   IV. the communications module is configured to perform bidirectional communications with both the distribution system operator's network management platform and a smart contract software component.

2. The device according to claim 1, wherein said system on module is configured to receive measurements from the metering module, to encode them together with both a set point, sent by the distribution system operator, and a difference between the set point and an actual customer's consumption or production values, and then to transfer these values to both the certification module and the customer communication module.

3. The device according to claim 2, wherein an information package sent to the customer management system by the customer communication module contains all the real time measurement data, the set point of a relevant sampling period which is received from the distribution system operator's network management platform through the communication module, and differences between the set point and actual customer energy use.

4. The device according to claim 2, wherein the communication module is configured to receive the set point from the distribution system operator's network management platform and to transfer the set point to the certification module; and using different communications, the communication module is configured to send a certified data packet that is received by the certification module to both a smart contract software component and to the distribution system operator's network management platform, wherein the smart contract is configured to record values in a blockchain infrastructure which is owned by the distribution system operator.

5. The device according to claim 2, further comprising a metering module for real time monitoring and recording of electrical parameters of energy coming from the distribution system operator's grid.

6. The device according to claim 2, wherein, in order to prevent any dispute between energy sector actors, information contained in the certified data that is sent to the distribution system operator's network management platform by the communication module is identical to information sent to the customer management system by the customer communications module.

7. The device according to claim 2, wherein an external distribution system operator's smart meter is directly connected to a customer grid so that electric power is provided to the customer grid directly by the distribution system operator's smart meter; and the distribution system operator's smart meter is connected to the device itself for performing electrical measurement of the customer's behavior.

8. The device according to claim 1, wherein information sent to the customer management system by the customer communication module contains real time measurement data, the set point of a relevant sampling period received from the distribution system operator's network management platform via the communication module, and difference between the set point and a customer's actual energy use.

9. The device according to claim 8, wherein the communication module is configured to receive the set point from the distribution system operator's network management platform and to transfer the set point to the certification module; and using different communications, the communication module is configured to send a certified data packet that is received by the certification module to both a smart contract software component and to the distribution system operator's network management platform, wherein the smart contract is configured to record values in a blockchain infrastructure which is owned by the distribution system operator.

10. The device according to claim 8, further comprising a metering module for real time monitoring and recording of electrical parameters of energy coming from the distribution system operator's grid.

11. The device according to claim 8, wherein, in order to prevent any dispute between energy sector actors, information contained in the certified data that is sent to the distribution system operator's network management platform by the communication module is identical to information sent to the customer management system by the customer communications module.

12. The device according to claim 1, wherein the communication module is configured to receive the set point from the distribution system operator's network management platform and to transfer the set point to the certification module; and using different communications, the communications module is configured to send a certified data packet received by the certification module to both the smart contract software component and the distribution system operator's network management platform, wherein a smart contract is configured to record values in a blockchain infrastructure which is owned by the distribution system operator.

13. The device according to claim 12, further comprising a metering module for real time monitoring and recording of electrical parameters of energy coming from the distribution system operator's grid.

14. The device according to claim 12, wherein, in order to prevent any dispute between energy sector actors, information contained in the certified data that is sent to the distribution system operator's network management platform by the communication module is identical to information sent to the customer management system by the customer communications module.

15. The device according to claim 1, further comprising a metering module for real time monitoring and recording of electrical parameters associated with energy from the distribution system operator's grid.

16. The device of claim 15, wherein the electrical parameters comprise voltage, current, cos φ, active and reactive energy, and power.

17. The device according to claim 15, wherein, in order to prevent any dispute between energy sector actors, information contained in the certified data that is sent to the distribution system operator's network management platform by the communication module is identical to information sent to the customer management system by the customer communications module.

18. The device according to claim 1, wherein in order to prevent any dispute between energy sector actors, information contained in the certified data sent to the distribution system operator's network management platform, by the communication module, is exactly the same as information sent to the customer management system by the customer communication module.

19. The device according to claim 1, wherein an external distribution system operator's smart meter is directly connected to a customer grid so that electric power is provided to the customer grid directly by the distribution system operator's smart meter; and the distribution system operator's smart meter is connected to the device itself for performing electrical measurement of the customer's behavior.

20. A system for facilitating, verifying and ensuring compliance of parties to a contract or agreement, the system automatically executing contact clauses when specified conditions are met, thereby permitting financial transactions among the parties, the system comprising:
- at least one device according to claim 1, for certified measurement of electrical parameters and customer's flexibility behavior, and for communicating with a distribution system operator;
- a blockchain infrastructure having a plurality of blockchain nodes;
- a smart contract software component;
- a power grid;
- a customer grid;
- a customer management system;
- a distribution system operator's network management platform;
- wherein elements of said system are directly or indirectly connected and communicating with each other.

* * * * *